United States Patent
Hsu

(10) Patent No.: US 10,898,965 B2
(45) Date of Patent: Jan. 26, 2021

(54) HELICAL WELDING WIRE AND HELIX FORMING WELDING TORCH

(71) Applicant: Illinois Tool Works Inc., Glenview, IL (US)

(72) Inventor: Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 777 days.

(21) Appl. No.: 15/268,578

(22) Filed: Sep. 17, 2016

(65) Prior Publication Data

US 2018/0079024 A1  Mar. 22, 2018

(51) Int. Cl.
*B23K 9/12* (2006.01)
*B23K 9/18* (2006.01)
*B23K 9/173* (2006.01)
*B23K 9/28* (2006.01)
*B23K 35/02* (2006.01)
*B23K 9/133* (2006.01)

(52) U.S. Cl.
CPC .............. *B23K 9/125* (2013.01); *B23K 9/123* (2013.01); *B23K 9/1333* (2013.01); *B23K 9/1336* (2013.01); *B23K 9/173* (2013.01); *B23K 9/186* (2013.01); *B23K 9/282* (2013.01); *B23K 35/0266* (2013.01); *B23K 35/0277* (2013.01)

(58) Field of Classification Search
CPC ...... B23K 9/123; B23K 9/125; B23K 9/1333; B23K 9/173; B23K 9/186; B23K 9/282; B23K 11/31
USPC ...................................................... 219/137.8
See application file for complete search history.

(56) References Cited

U.S. PATENT DOCUMENTS

| | | | | |
|---|---|---|---|---|
| 1,946,870 A | * | 2/1934 | Moon ....................... | B21F 3/04 72/141 |
| 2,439,685 A | * | 4/1948 | Findley ................... | F16B 37/12 411/438 |
| 3,112,393 A | * | 11/1963 | Manz ..................... | B23K 9/122 219/137.44 |
| 3,162,228 A | * | 12/1964 | Rosan ..................... | F16B 37/12 411/176 |

(Continued)

FOREIGN PATENT DOCUMENTS

| CN | 85100694 | 12/1985 |
|---|---|---|
| CN | 1802234 | 7/2006 |

(Continued)

OTHER PUBLICATIONS

PCT, Notification of Transmittal of the International Search Report and the Written Opinion of the International Searching Authority, or the Declaration, in PCT/US2017051090, dated Dec. 19, 2017 (13 pages).

(Continued)

*Primary Examiner* — Brian W Jennison
(74) *Attorney, Agent, or Firm* — McAndrews, Held & Malloy, Ltd.

(57) ABSTRACT

Systems and methods are disclosed that provides a helical wire for use in welding applications. A torch can be adapted to form the helical wire from a straight wire and to provide the helical wire as a consumable electrode in a welding or cladding application. The helical wire can be, for example, solid, tubular, or seamless tubular. The torch concurrently forms the helical wire and provides welding current for the welding or cladding application.

9 Claims, 5 Drawing Sheets

(56) References Cited

U.S. PATENT DOCUMENTS

| | | | | |
|---|---|---|---|---|
| 3,520,334 A | * | 7/1970 | Mueller | B21F 3/04 |
| | | | | 140/92.94 |
| 3,567,900 A | | 3/1971 | Nelson | |
| 3,576,966 A | * | 5/1971 | Sullivan | B23K 9/0213 |
| | | | | 219/137 R |
| 4,040,462 A | * | 8/1977 | Hattan | F16B 37/12 |
| | | | | 411/277 |
| 4,074,105 A | | 2/1978 | Minehisa | |
| 4,891,494 A | | 1/1990 | Baujat | |
| 5,849,238 A | * | 12/1998 | Schmidt | B29C 33/04 |
| | | | | 264/401 |

FOREIGN PATENT DOCUMENTS

| | | |
|---|---|---|
| CN | 103222343 | 7/2013 |
| DE | 20 2011 051668 U1 | 11/2011 |
| JP | S629774 | 1/1987 |
| JP | H10193123 | 7/1998 |

OTHER PUBLICATIONS

Canadian Office Action Appln No. 3,036,375 dated Feb. 17, 2020 (4 pgs).

* cited by examiner

HELICAL WELDING WIRE AND HELIX FORMING WELDING TORCH

BACKGROUND

Many heavy equipment fabrications are performed with an open arc gas metal arc welding (GMAW) process and cladding process. Tandem arc welding and variations of this process are examples of high deposition welding processes employed. Tandem arc welding contains two welding arcs to increase deposition and welding travel speed. However, due to the nature of two arcs, it suffers from downtime issues by keeping the arc lit simultaneous and without interference. Further, tandem arc welding suffers from a difficulty to program from complex and bulky tool front end for complex joint geometry and to operate complex two-wire delivery equipment and keep both arcs stable and not interfere. Typically, due to such complexities, tandem arc welding systems can be quite costly to purchase, maintain, and operate. Another high deposition process is submerged arc welding (SAW), but due to the necessity of flux coverage, SAW is limited to certain welding positions (e.g., most commonly in a flat position). SAW can be performed with single arc/wire or multiple arcs/wires. Yet another high deposition process is cladding with GMAW with a torch weave and/or a wire spin, and a hot wire with a laser. Extended electrode stickout, electrode negative polarity, metal core wire and buried arc are other known techniques to improve deposition.

What is needed is an apparatus, system or method that provides a single wire/single TCP/single open arc welding process that is simpler, lower cost, and more reliable than the tandem open arc process with a deposition rate higher than 20-25 pounds/hour (typical limit of single arc).

High current is needed to provide the melt off of the wire at high deposition. However, one problem of high deposition single wire welding is arc instability from rotational arc metal transfer. The metal transfer forces such as, for example, the electromagnetic pinch force is not able to detach the liquid metal in small amounts, thereby forming an unstable or unpredictable rotating liquid string tethered to the wire end with arc pressure and resulting in excessive spatter and process instability.

Further, high current for high deposition single wire welding can suffer from finger shaped penetration due to the high energy density distribution of the arc from a round wire. The penetration profile can cause the root of the joint to be missed or make the part fit-up in a situation in which wire placement alignment with respect to the joint is critical. This can increase the tooling cost and part dimensional control cost to improve fit-up for a fabricator. Further, joint preparation cost (e.g., necessitating precision laser or waterjet cutting or CNC machining of the joint prior to welding) can also increase. Ultimately, weld quality can be compromised if the pre-welding operations are not controlled.

In addition, high current for high deposition single wire welding can suffer from intense arc gouges on the side walls of the joint and can melt away the weldment surface without filler metal to cover it back up, resulting in an undercut. This problem is even more pronounced when weaving is necessary to compensate for poor joint fit-up, thereby pushing the arc towards the sidewalls of the joint. The side-to-side movement of the arc will likely encroach on the side walls of the joint, melt it, leaves a cavity without filler metal to completely backfill the cavity.

In laser cladding with hot wire, the laser spot can be expanded optically to be much wider than wire diameter. The wire delivery and laser head are usually mounted on the same robot arm making it difficult to weave and spread wire deposition as wide as laser independent of the laser by a robot.

BRIEF SUMMARY

Some apparatuses, systems, and methods according to the present disclosure relate to a helical welding wire and a welding system that can provide the helical welding wire for use in welding applications substantially as illustrated by and/or described in connection with at least one of the figures, as set forth more completely in the claims.

DETAILED DESCRIPTION

Some embodiments of apparatuses, systems, and methods according to the present disclosure relate to welding systems that use coiled consumable electrodes, for example, in welding applications.

In some embodiments according to the present disclosure, coiling consumable electrodes such as wire is different from the wire that is wrapped or "coiled" around a spool in wire packaging which can have a coil diameter between 5 inches and 36 inches. The coiled wire of some embodiments according to the present disclosure can take the form of a helical shape before being wrapped around the spool in wire packaging, for example. In some embodiments according to the present disclosure, the wire, which is not of helical form when wrapped around the spool in the wire packaging, can be pulled from the spool and made into helical form by the welding torch, for example.

Some embodiments according to the present disclosure provide that the consumable electrode used in a welding system includes a solid wire or a tubular wire. The solid wire or the tubular wire enters or is fed into a weld tool where the wire is formed into or exits as a coiled wire before being melted and/or consumed. In some embodiments, the weld tool can be part of the welding torch or can be part of the contact tip in the welding torch. In some embodiments, it is the contact tip that forms the coiled wire (e.g., helical wire, a spiral wire, etc.). Thus, relatively straight wire can enter the contact tip and exit as a helical wire (e.g., a coiled wire).

Some embodiments according to the present disclosure provide that the consumable electrode used in a welding system can be, for example, a coiled solid wire (e.g., helical solid wire) or a coiled tubular wire (e.g., helical tubular wire).

Some embodiments according to the present disclosure provide that the consumable electrode is a coiled consumable electrode when entering and exiting the contact tip (also known as a contact tube) of a welding torch. In some embodiments, the consumable electrode is a coiled consumable electrode (e.g., a coiled wire, a helical wire, etc.) when passing through the liner to the contact tip. In some embodiments, the consumable electrode is a coiled consumable electrode when fed into and/or exiting the welding torch.

Some embodiments according to the present disclosure provide that the use of a coiled consumable electrode such as a coiled wire, for example, can provide a higher melt off rate from increased resistive heating in the effective electrical stickout after the contact.

Some embodiments according to the present disclosure provide that the use of a coiled consumable electrode such as a coiled wire, for example, can provide a built-in weave or spin arc that can be beneficial in overcoming gaps and the lack of sidewall fusion.

Figure 1:
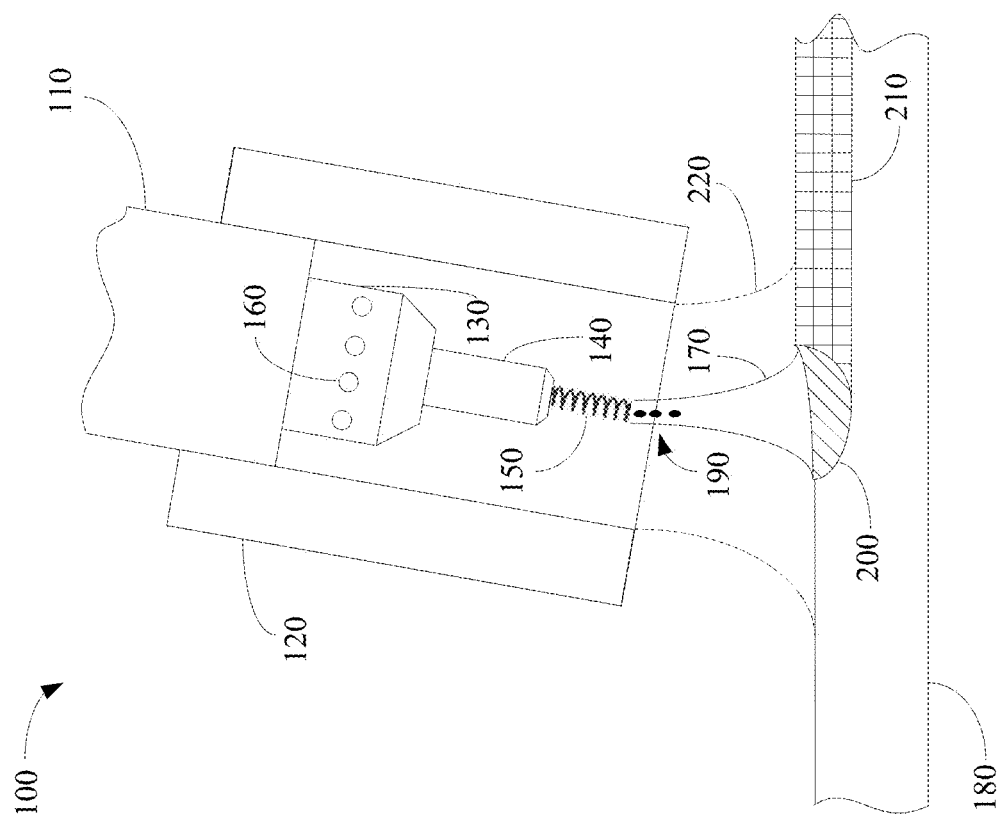
FIG. 1 shows a portion of an embodiment of a welding torch according to the present disclosure.

FIG. 1 shows a portion of an embodiment of a welding torch 100 according to the present disclosure. In some embodiments, the welding torch 100 can be connected to a welding cable that is coupled to one or more of the following: a power supply, a gas source, and a wire feeder. The welding cable provides electrical power, wire, and/or shielding gas to the welding torch 100. In some embodiments, the welding torch 100 can be, for example, a cladding torch. In some embodiments, the welding torch 100 can be held by or integrated with a robotic arm in an automatic welding system. In some embodiments, the welding torch 100 can a handheld welding torch that is held by a human operator during a welding application. In some embodiments, the welding torch 100 can be, for example, a welding gun with a handle that includes a trigger that causes wire to be fed at the contact tip and an arc to form between the wire and the workpiece. The handle can be connected to a neck or goose neck 110 which connects to a nozzle 120 (e.g., a gas nozzle). The neck 110 terminates in a gas diffuser 130. A contact tip 140 extends from the gas diffuser 130 and provides the consumable electrode 150 (e.g., a wire, a strip, etc.).

During a welding operation, the consumable electrode 150 is fed through the neck 110, the gas diffuser 130, and the contact tip 140. Shielding gas is fed through the neck 110 and is diffused through the gas diffuser 130 through orifices 160. An arc 170 is formed between the consumable electrode 150 and the workpiece 180 (e.g., a base metal). The arc 170 (or the voltage and/or current used to trigger the arc 190) melts the consumable electrode 150 which is deposited (e.g., as droplets 190, liquid metal, etc.) along the arc 170 to the workpiece 180. The arc 170 also causes a molten puddle 200 to form on the workpiece 180. As the welding torch 100 moves along the welding direction, the molten puddle 200 cools to form a solidified weld 210. The molten puddle 200 and a portion of the solidifying weld 210 are protected by the shield gas 220.

In some embodiments, the consumable electrode 150 is a coiled wire as illustrated in FIG. 1. In some embodiments, the coiled wire can include, for example, a corkscrew wire, a spiral wire, or any wire and/or strip that is in a coiled configuration, for example, when exiting one or more of the following: the contact tip 140, the nozzle 120, and/or the welding torch 100. The consumable electrode 150 can include, for example, a wire that can be coiled similar to the metal liner used for wire delivery from the packaged wire to the contact tip 140. In one embodiment, the outer diameter of the coil can be approximately 5 mm and the outer diameter of the wire can be approximately 1 mm, for example. In some embodiments, the contact tip 140, the liner, and the drive rolls are matched with the outer diameter of the coil.

Figure 2:
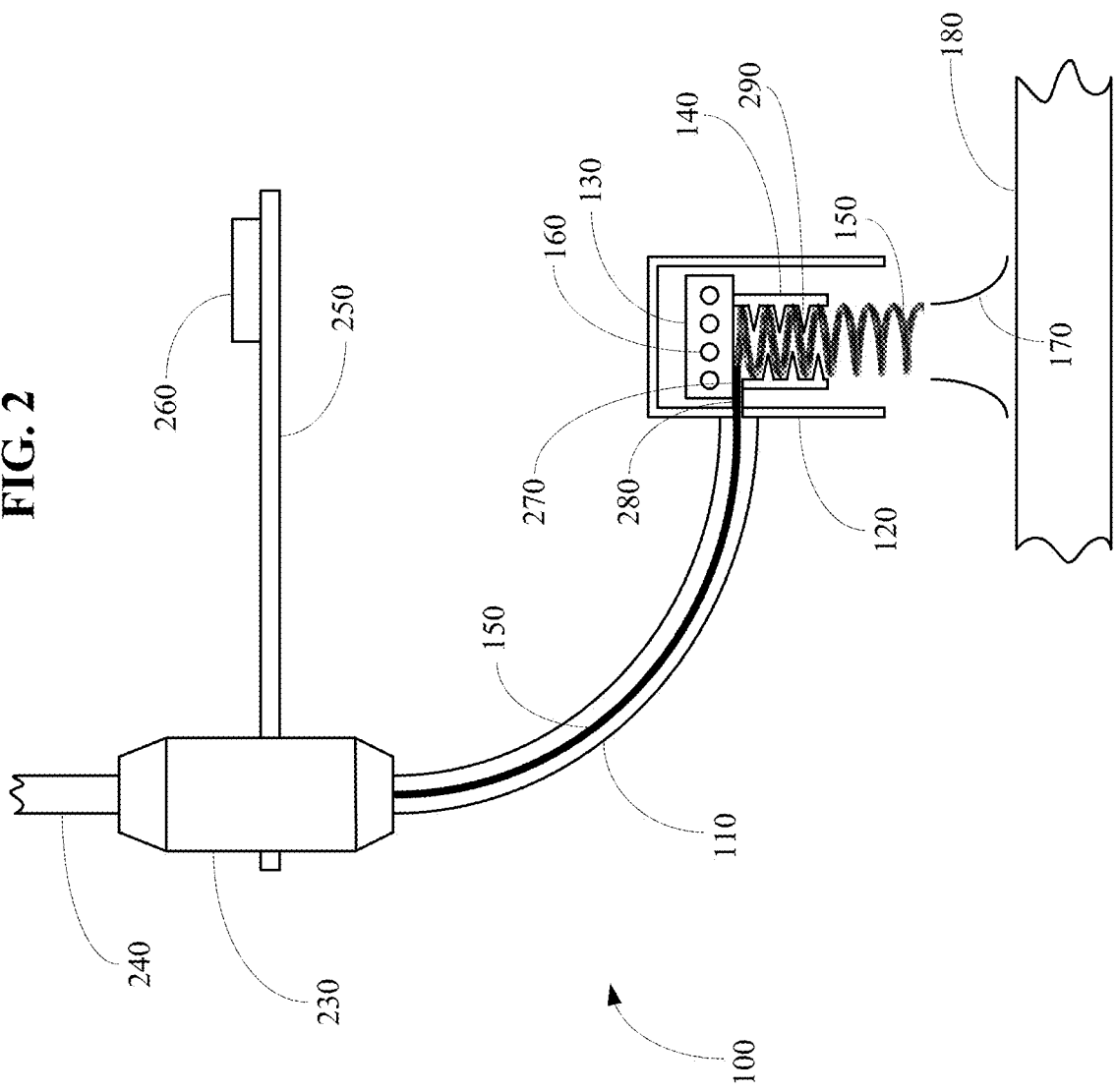
FIG. 2 shows another embodiment of the welding torch according to the present disclosure.

FIG. 2 shows another embodiment of the welding torch 100 that has a built-in wire coiler (or helix former or spiral former) that forms the wire into a coil (e.g., a helix, a spiral, any type of coil, etc.) according to the present disclosure. Referring to FIG. 2, the welding torch 100 is attached to a torch holding bracket 250 that can be attached to a welding robot, for example, via a robot mounting plate 260 (which can include a collision sensor). The welding torch 100 includes a composite welding cable 240 that can provide, for example, welding power, shielding gas, current, control signals, coolant, and a consumable (e.g., wire) to a torch handle and/or torch body 230. The torch handle and/or torch body 230 is connected to the nozzle 120 via the neck 110 (e.g., a goose neck). In the illustrated embodiment, the wire 150, which is fully supported by the wire liner, has not yet been coiled as it is transported through the neck 110. The nozzle 120 is configured to convey shielding gas from 160 to envelope 150, 1909, 170, 200, 210 and its surroundings. The wire-forming contact tip 140 that includes an inlet 270 (e.g., an inlet hole) is configured to receive the incoming wire 150. The contact tip 140 is configured with internal threads so that, as the wire is pushed into the contact tip 140 through the inlet 270, the internal threads of the contact tip 140 cause the wire 150 to form a coil or helix. The coiled wire 150 exits the contact tip, nozzle 120, and/or the welding torch 100 for use as a consumable electrode in a welding application.

Figure 3:
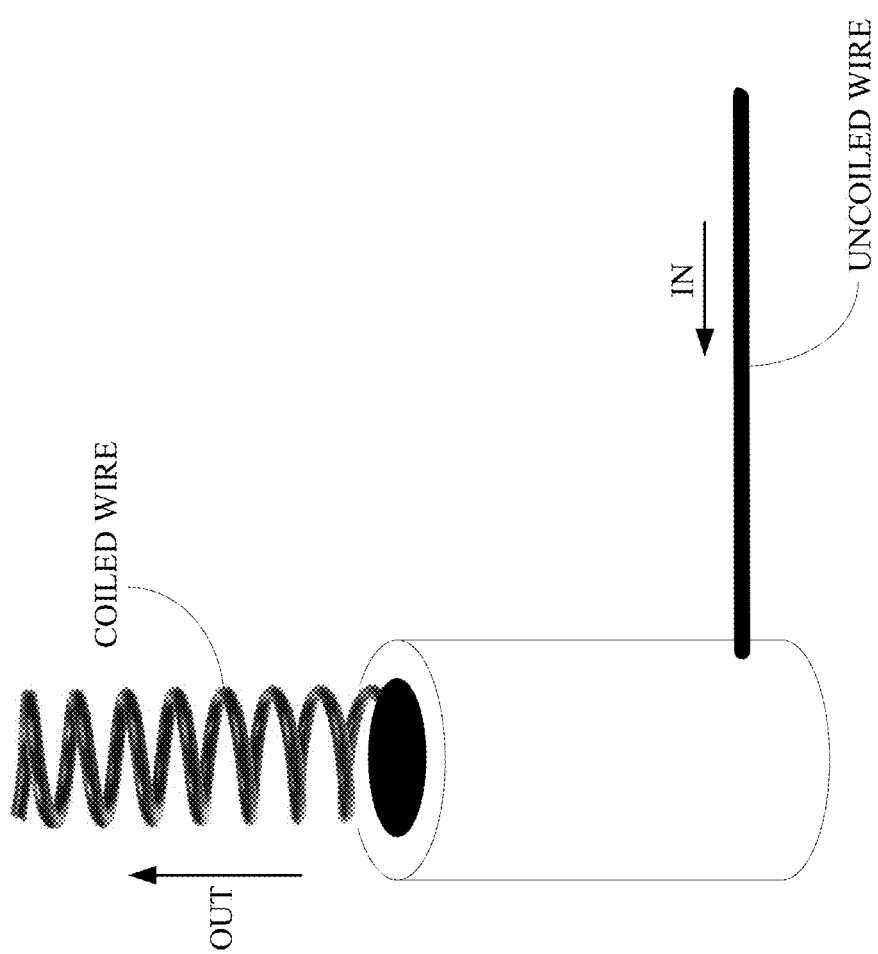
FIG. 3 shows an embodiment of a wire coiler according to the present disclosure.
Figure 4:
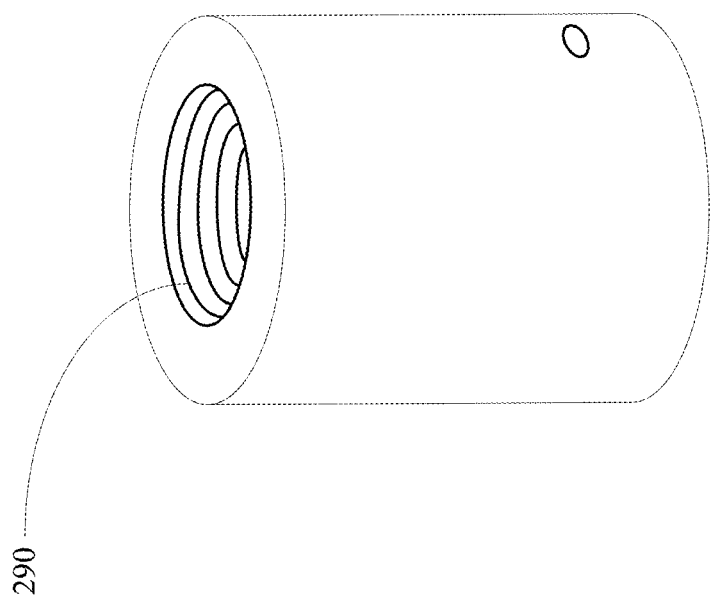
FIG. 4 shows the embodiment of the wire coiler in FIG. 3 in which the wire coiler includes internal threads according to the present disclosure.

For illustration purposes, FIG. 3 shows the manner in which an uncoiled wire enters a wire coiler and exits as a coiled wire or a helix-shaped wire. FIG. 4 shows internal threads 290 that are configured to receive an incoming uncoiled wire and to form a coiled wire or a helix-shaped wire. Such a concept can be integrated with the contact tip 140 or can be separate from the contact tip 140. In some embodiments, FIGS. 3 and 4 show a die that is part of the contact tip 140 in a welding torch 100. The contact tip 140 concurrently (e.g., simultaneously) provides welding current and forms the helix-shaped wire (e.g., coiled-shaped wire) from a substantially straight wire that is used as a consumable electrode during a welding operation, for example. The wire may become softened as it is resistively heated as it is being formed by the internal threads.

In operation, the incoming wire 150 to the welding torch 100 is uncoiled wire that is generally straight. In some embodiments, generally straight means that the wire has a cast of 15 to 60 inches and a helix of 0-1 inch in a typical MIG wire, for example. The wire 150 is conveyed to the inlet hole 270 of the wire coiler through the wire liner and the wire guide 280 so that the wire is fully supported before reaching the wire coiler which, in some embodiments, is part of the contact tip 140 and/or the nozzle 120. The wire coiler can be a cylindrical component with an internal thread or sloped grooves that form wire into a coil shape or more generally causing helix plastic deformation. The wire coiler can be mounted (e.g., screwed) onto the gas diffuser 130 which secures the wire coiler and dispenses the shielding gas. In some embodiments, the wire coiler also serves as or is part of the contact tip 140 and passes welding current to the wire 150. In some embodiments, the contact tip 140 can be separate from the wire coiler either upstream or downstream of the wire coiler in a wire conveyance. The wire 150 experiences plastic deformation inside the wire coiler and comes out of the wire coiler with an accentuated helix or in a coiled shape.

Figure 5:
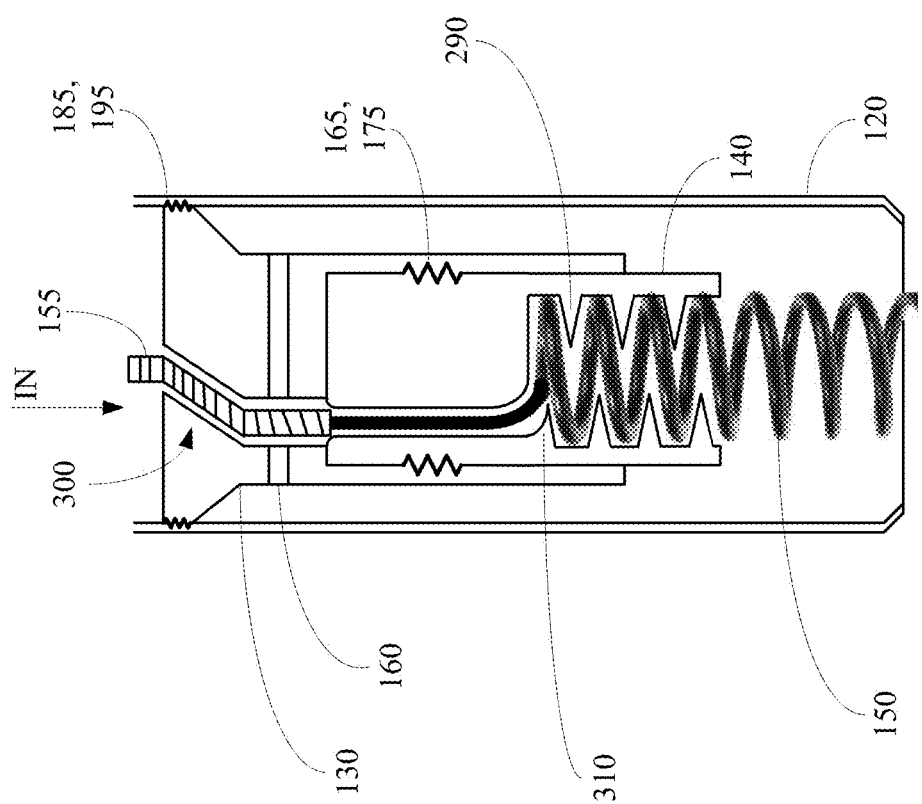
FIG. 5 shows another embodiment of the welding torch according to the present disclosure.

FIG. 5 shows another embodiment of a portion of the welding torch 100 that has a built-in wire coiler (or helix former) that forms the wire into a coil (e.g., a helix) according to the present disclosure. Referring to FIG. 5, the contact tip 140 is configured to allow for the vertical insertion of the wire 150 in contrast to the horizontal insertion of the wire 150 as in the embodiment illustrated in FIGS. 2-4. Similar to the previous embodiment illustrated in FIGS. 2-4, the contact tip 140 serves as both an electrical contact tip and a helix wire forming die. In some embodiments, the contact tip 140 is made of materials or composites that provide high electrical conductivity, retain its hardness at elevated temperatures (e.g., during welding operations), and resist erosion (e.g., electrical erosion). An example of this material is a tungsten-copper metal matrix composites (MMC) produced by powder metallurgy metal forming methods. Another example is a material comprising copper alloy, tungsten, graphite, carbide, and/or synthetic polycrystalline diamond (e.g., boron-doped synthetic polycrystalline diamond), at least some of which are produced by additive manufacturing such as, for example, electron beam additive manufacturing, direct laser powder deposition or direct metal laser sintering with a powder bed. Yet another manufacturing method of the wire coiling contact tip is explosive shock compaction. The contact tip 140 can also be made using three-dimensional metal printing processes.

Referring again to FIG. 5, in some embodiments, the incoming wire 150 is initially centered with respect to the contact tip 140. Before entering the contact tip 140 and/or the diffuser 130, the wire 150 is curved or displaced 300 such that it is off center with respect to the center of the contact tip 140. A wire liner 155 can be used to guide the wire 150 from a wire feed (not shown) to the contact tip 150, for example. FIG. 5 shows that a wire liner 155 is also configured to bend and guide the wire 150 off the torch axis so that the wire 150 enters the wire coiler of the contact tip 140 through a chamfer entry on the side of the wire coiler. The straight wire comes in from the liner 155 which is bent by the internal conduit of the gas diffuser 130 and terminates at the rear end of the contact tip 140, which also serves as wire coiler. The contact tip 140 has external threads 165 that engage the internal threads 175 of the gas diffuser 130. The diffuser 130 has external threads 185 that engage the internal threads 195 of the shielding gas nozzle 120. The threads 165, 175, 185, 195 are designed so that the offset liner 155 is aligned with the wire inlet of the contact tip/coiler 140. The wire 150, which is substantially straight, enters the contact tip 140 from above (e.g., from above the gas diffuser 130) in the direction that the helical coil 150 is generally provided from the contact tip 140. The threads 290 (e.g., internal threads of the contact tip 140) adapt the previously substantially straight wire 150 into the helical wire 150.

In some embodiments, the thread 290 provides for a gradual 90 degree turn 310 that can bend the wire 150 to the side.

In some embodiments, it is advantageous to combine the wire coiler and electrical contact tip 140. In such situations, the contact is very reliable to minimize arcing and contact resistive heating between the wire 150 and the contact tip 140. The configuration provides ease of service in that replacing two torch consumables (e.g., the wire coiler and the contact tip 140) are combined into the single step of changing one consumable. Further, the wire 150 is softened by the resistive heating of the welding current, thereby reducing the feeding force used to push the wire 150 through the wire coiler. The wire feeding force use for delivering the wire 150 through the coiler contact tip 140 is greater than that used for conventional contact tips. Therefore, a wire feeder with sufficient torque is needed to provide sufficient feeding force. In some embodiments, the torch body 230 can include, for example, a motorized wire feeder that is upstream of the torch neck 110 to provide the force to push the wire 150 through the coiler contact tip 140. In some embodiments, the torch body 230 can include, for example, a wire pre-heater (e.g., an integral wire pre-heater) that softens the wire 150 before the wire 150 enters the coiler contact tip 140. The wire pre-heater can provide, for example, a resistive wire preheat and/or an inductive wire preheat. A resistive preheater includes two contact tips, as described in U.S. Application No. 62/265,712, filed Dec. 10, 2015, which is incorporated herein by reference in its entirety. A separate power source output is fed into the two contact tips to preheat wire to an elevated temperature to soften the wire before it enters the bottom tip which doubles as a coil forming die. In some embodiments, by using a wire preheater to soften the wire, the force needed for wire forming is reduced and the useful life of the forming tip can be extended.

Some embodiments provide that the coil diameter is 3 to 20 times the wire diameter.

Some embodiments provide that the coil pitch can be approximately 1-50 mm or larger and can be controlled by the internal thread pitch of the wire coiler. Other embodiments provide that the coil pitch can be less than approximately 1 mm as controlled by the internal thread pitch of the wire coiler. Some embodiments provide that the exiting wire can be a compact coil with small pitch or an undulating wire with a very large pitch.

Some embodiments that use pre-coiled wire might use a spring-loaded contact tip 140 to ensure a reliable wire-to-tip contact. The spring-loaded tip can include a contactor that is pushed by a spring force against the wire so that a positive contact force is maintained between the contact tip and the coiled wire.

Some embodiments can provide that even a low wire feed speed can result in a high deposition rate since more wire can be packed in coil form than in an uncoiled form. Thus, for a given wire feed speed, the deposition rate is greater for coiled wire than for wire that is not coiled. This can relieve the burden of using a high speed wire drive that is custom designed for high wire speed and high deposition welding. Some embodiments provide that even a wire feeder that is typically not used for high deposition welding can be used to deliver high deposition rates without increasing the feed speed.

Some embodiments provide that, since the wire is coiled, coiled wire is more flexible than a large diameter round wire, that is not coiled, of equivalent cross sectional area. Large diameter round wire can suffer from feeding issues due to its stiffness. In other words, coiled wire is easier to feed than a large diameter wire that is not coiled for an equivalent cross-sectional area.

Some embodiments provide that the wire is coated with a nonconductive, yet metallurgically innocuous coating, to amplify the effect of resistive heating in a coiled form. The insulating coating can be applied after the final finishing drawing die and copper flash operation during wire production or manufacturing. In some embodiments, after the coiling operation, the exterior coating of the coil can be removed so that the coil can transfer current when making contact with the contact tip 150. Some embodiments provide that a nonconductive organic binder be used which can be burned off during resistive extension heating.

Some embodiments provide amplified resistive preheating from coiled wire to drive out moisture in the wire and reduce the propensity of hydrogen induced cracking.

Some embodiments provide that the coiled wire can have amplified effective stickout when the wire exits the contact tip 150. Much more wire is packed in the electrical stickout which can substantially increase the resistive heating effect, similar to results from extended stick-out GMAW and SAW, but with much smaller physical contact-tip-to-work distance (CTWD) and much better wire placement accuracy or controllability. This can increase the melt off rate for high deposition welding without increasing the current while reducing heat input into the workpiece 180, thereby reducing distortion, reducing base metal dilution (e.g., in high carbon equivalent steel), and reducing heat affected zone size (e.g., in advanced high strength steel). Some embodiments contemplate that, due to the substantially increased resistive joule heating, the current need not be increased to a level that results in unstable rotational metal transfer.

Some embodiments provide that the coiled wire can reduce the tangle in bulk packaging and ease the precision winding in spools due to the substantially larger coil diameter than wire diameter in relation with wire winding loop diameter.

Some embodiments provide that a spin action of the arc 170 can occur when using coiled wire during a welding operation. The spin action of the arc 170 can also provide increased travel speed and/or bridging gap. Further, the spin action of the arc 170 can enhance sidewall fusion in a J groove, narrow groove or narrow gap welding in a compact torch without a robot weave which can provide better joint accessibility than the robot weave. The coiled wire can also provide through-the-arc signals for seam track without the robot weave. The helical wire form naturally spins the arc within a groove. In manual welding (or semi-automatic welding) the operator travels along the weld axis without weaving however the coiled wire may produce the effect of torch weaving, thus taking the burden of weaving out of an operator's hand and making a novice operator weave like a pro. Because of the fixed pattern of wire oscillation, the welding current may produce electronics feedback of seam location in certain joint and plate thickness combinations, for manual welding. In CV spray arc, for example, the welding current is regulated to maintain arc length and the "highs" and "lows" pattern of current waveform can be used to determine if the wire is centered inside the groove. The helical wire can oscillate the arc much faster than is possible by robot weave, thereby improving seam tracking performance. The coiled wire can be combined with a robot weave for cladding applications where less dilution can be achieved than by a robot weave alone.

Some embodiments contemplate that welding torches 100 that use coiled wire can find application in metal inert gas (MIG) welding (e.g., high deposition MIG welding).

Some embodiments contemplate that welding torches 100 that use coiled wire can find application in heavy plate, high deposition gas metal arc welding (GMAW), flux-cored arc welding (FCAW), or other types of open arc welding.

Some embodiments contemplate that welding torches 100 that use coiled wire can find application in submerged arc welding (SAW) with large wire diameter using solid wire and/or metal core wire.

Some embodiments contemplate that the welding torch 100 that uses coiled wire can find application in cladding, anti-corrosive surfacing, hard facing, and/or overlaying applications with either cold wire (e.g., unheated wire) or hot wire (e.g., pre-heated wire) in combination with heat sources such as a laser, electron beam, GMAW, gas tungsten arc welding (GTAW), and plasma arc (where wire is fed into a melt pool created by other heat sources).

Some embodiments contemplate that the coiled consumable electrode can be solid wire and/or strip, and/or tubular wire and/or strip, and/or seamless tubular wire.

Some embodiments contemplate that the consumable electrode can take different forms and shapes. For example, the consumable electrode can take the shape of a flat ribbon solid wire that when perpendicular to a joint can provide more tolerance with respect to wire placement precision. In another example, the consumable electrode can take the shape of a gear-tooth wire that can naturally pulse when used with continuous voltage (CV) welding power supplies. In yet another example, a zig-zag wire can provide a built-in weave during welding operations.

Some embodiments can provide a higher melt off rate from increased resistive heating in the electrical stickout after the contact tip without excessive complexity, cost, and downtime. Some embodiments provide a torch that is configured to provide a higher deposition rate as a result of the consumable electrode being coiled when exiting the contact tip compared to a deposition rate of a solid wire with a same outer diameter.

Some embodiments provide a higher melt off rate for a coiled consumable than a melt off rate for an uncoiled or straight (e.g., generally straight) consumable electrode for a particular welding current.

Some embodiments provide a built-in weave as a result of the consumable being coiled when exiting the contact tip. In some embodiments, no moving parts are required to provide the built-in weave. Some embodiments provide a torch that can provide a spin arc as a result of the consumable electrode being coiled when exiting the contact tip.

Some embodiments provide a torch that is configured to provide an arc weave or a wire weave inside a geometrically confined joint such as, for example, a single bevel T-joint. Where some embodiments might succeed in providing an arc weave or a wire weave inside a geometrically confined joint, a robot weave alone might suffer from torch-workpiece interference issues. Some embodiments contemplate combining the robotic torch weave with the built-in weave to achieve a particular clad geometry.

Some embodiments provide that the torch is configured to provide an increased melt off rate from increased resistive heating in an effective electrical stickout greater than contact-tip-to-work distance minus an arc length as a result of the consumable electrode being coiled when exiting the contact tip.

Some embodiments provide that the contact tip can include a single piece or multiple pieces. Further, multiple coilers can be used. For example, multiple coilers can be sequentially arranged such that one coiler works on the consumable electrode after another coiler worked on the consumable electrode. Thus, for example, each successive coiler can further reduce the diameter of the coiled consumable electrode. Multiple contact tips can also be used sequentially to successively adapt the coiled consumable electrode.

Some embodiments provide a torch for a welding-type operation including, for example, a welding operation, a cladding operation, carbon arc gouging, cutting, etc.

Some embodiments provide coiled wire welding which is cost-effective adaptive welding in automation (e.g., arc/wire weave without motion devices for the weave). In hard or soft/flexible automated welding according to some embodiments, it is advantageous to sense the joint and to make the automated welding adaptive to actual welding conditions, such as joint fit-up and tracking the seam. Traditional seam tracking or adaptive welding often relies on a robot weave which might require extra programming, and might suffer from limitations relating to joint access issues such as a single V-bevel joint interfering with the robot weave. The coiled wire and the resulting arc move the wire and arc inside the joint, producing undulating arc signals corresponding to a weld joint profile, as a proxy of the seam location, joint geometry, and early warnings of weld defects such as burn-through and lack of fusion. The arc welding process signals as a result of the coiled wire can be used as a sensor for detecting seam location, gaps, and weld defects in real time, and for closing the process control loop. Based on the perturbation of welding process signals as a result of the coiled wire, the control loop may use it to steer the robot, and change heat input of the power source and/or the deposition rate of the wire feeder.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A contact tip for a welding system, comprising:
   an inlet configured to receive a consumable electrode;
   internal threads configured to receive the consumable electrode via the inlet at a first end of the internal threads, to form the consumable electrode into a coiled consumable electrode from the first end of the internal threads to a second end of the internal threads, and to output the coiled consumable electrode from the contact tip.

2. The contact tip according to claim 1, wherein the coiled consumable electrode is a helix-shaped consumable electrode when exiting the contact tip.

3. The contact tip according to claim 1, wherein the contact tip is used in one or more of the following: a gas metal arc welding (GMAW), a metal inert gas (MIG) welding, and a flux-cored arc welding (FCAW).

4. The contact tip according to claim 1, wherein the contact tip is configured to be received by a torch that is configured to provide a cold wire or a hot wire to melt a pool created by one or more of a laser, a plasma arc, an electron beam, a gas tungsten arc, and a gas metal arc.

5. The contact tip according to claim 1, wherein the contact tip is manufactured by one or more of the following: a powder metallurgy process, a three-dimensional metal printing processes, a direct laser powder deposition, a direct metal laser sintering with a powder bed, an electron beam additive manufacturing, and an explosive shock compaction.

6. The contact tip according to claim 1, wherein the contact tip comprises one or more of a copper alloy, tungsten, graphite, carbide, and boron-doped synthetic polycrystalline diamond.

7. The contact tip according to claim 1, wherein the consumable electrode has a case of 15 to 60 inches and a helix of 0 to 1 inch at the first end of the internal threads.

8. The contact tip according to claim 1, further comprising external threads configured to couple the contact tip to a welding torch.

9. The contact tip according to claim 1, wherein the external threads are configured to align the inlet with a wire liner of a welding torch when installed in the welding torch.

* * * * *